United States Patent
Werth et al.

(10) Patent No.: US 10,215,593 B2
(45) Date of Patent: Feb. 26, 2019

(54) MAGNETIC SENSOR

(71) Applicant: Infineon Technologies AG, Neubiberg (DE)

(72) Inventors: Tobias Werth, Villach (AT); Mario Motz, Wernberg (AT); Gregor Wautischer, Wiener Neudorf (AT)

(73) Assignee: Infineon Technologies AG, Neubiberg (DE)

( * ) Notice: Subject to any disclaimer, the term of this patent is extended or adjusted under 35 U.S.C. 154(b) by 32 days.

(21) Appl. No.: 15/079,297

(22) Filed: Mar. 24, 2016

(65) Prior Publication Data

US 2017/0276516 A1 Sep. 28, 2017

(51) Int. Cl.
  *G01D 5/20* (2006.01)
(52) U.S. Cl.
  CPC .................. *G01D 5/2006* (2013.01)
(58) Field of Classification Search
  CPC .......... G01D 5/20; G01D 5/2006; G01D 5/14; G01D 5/145; G01D 5/147; G01P 3/487
  See application file for complete search history.

(56) References Cited

U.S. PATENT DOCUMENTS

| 8,884,611 B2* | 11/2014 | Hunger | G01D 5/145 257/427 |
| 2013/0335069 A1* | 12/2013 | Vig | G01R 33/0035 324/207.12 |
| 2014/0197820 A1* | 7/2014 | Ritter | G01B 7/14 324/207.13 |
| 2016/0123770 A1* | 5/2016 | Feucht | G01D 5/145 324/207.2 |
| 2017/0254666 A1* | 9/2017 | Ikeda | G01D 18/00 |

* cited by examiner

*Primary Examiner* — Son T Le
(74) *Attorney, Agent, or Firm* — Schiff Hardin LLP

(57) ABSTRACT

A sensor system for detecting a characteristic of a target object is described. The sensor system can include a sensor, such as a magnetic sensor, configured to sense magnet field components and to generate corresponding magnet field component signals based on the sensed magnet field components. The sensor system can include a processor that is configured to calculate a magnetic field angle based third magnetic field components. For example, the magnetic field angle can be calculated by determining a quadratic sum of a plurality of the magnetic field components. The characteristic of the target object can be determined based on the calculated magnetic field angle.

24 Claims, 7 Drawing Sheets

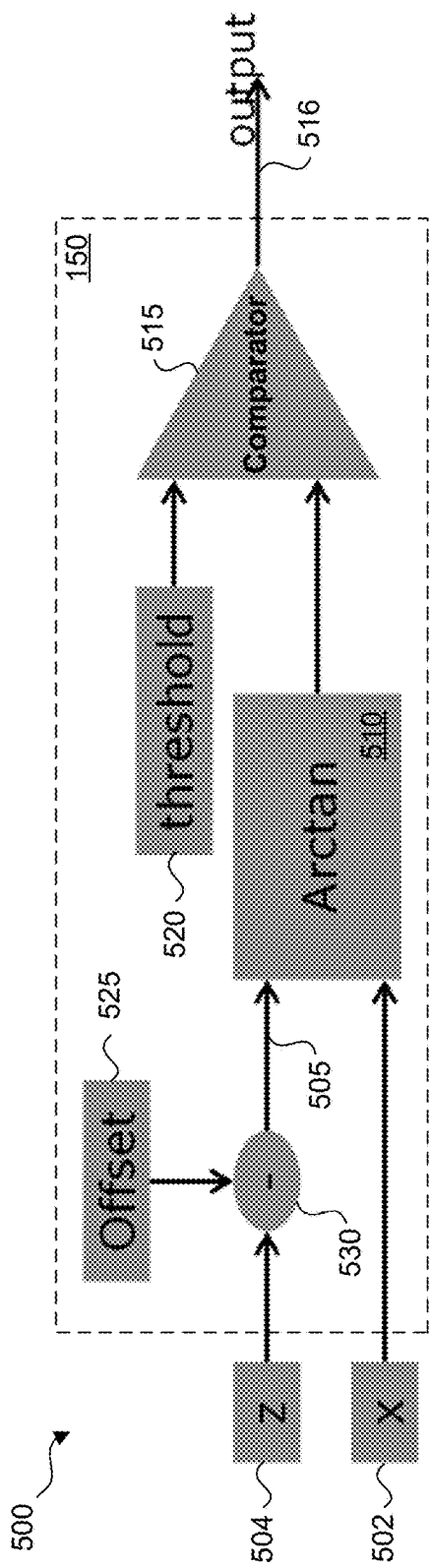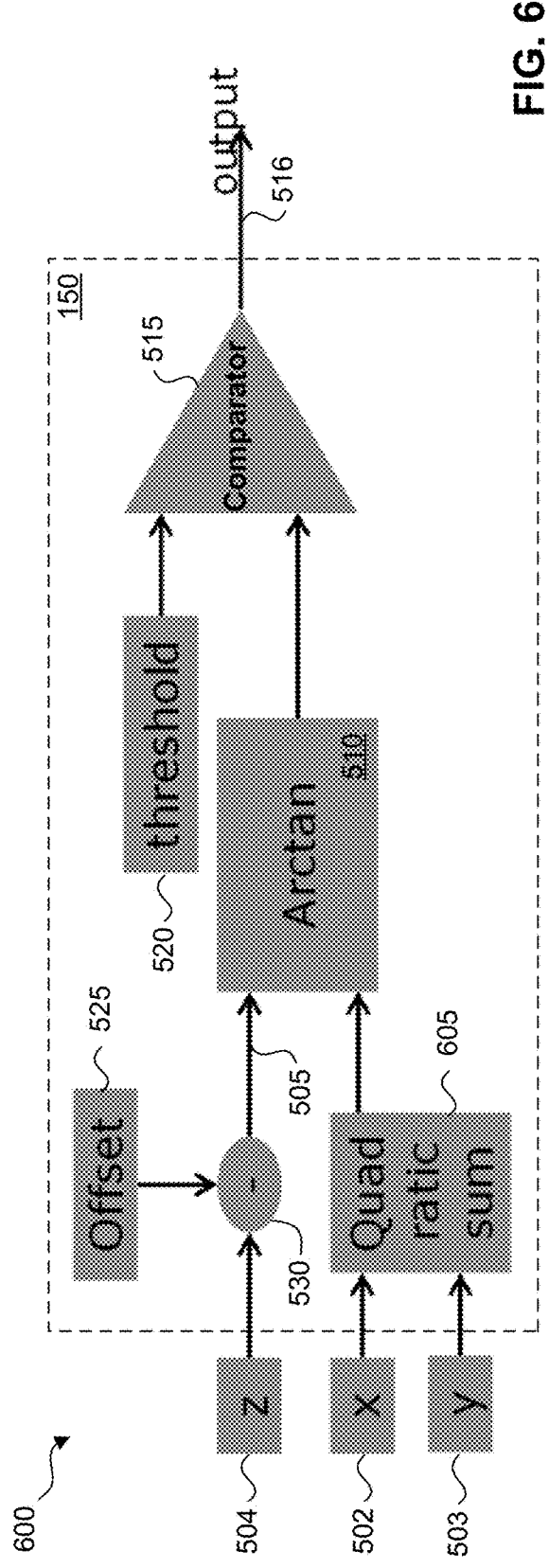

MAGNETIC SENSOR

BACKGROUND

Field

Embodiments described herein generally relate to sensors, including magnetic sensors having improved switching phase accuracy.

Related Art

Magnetic devices can include magnetoresistive sensors that are based on one or more magnetoresistive technologies—including, for example, tunnel magnetoresistive (TMR), giant magnetoresistive (GMR), anisotropic magnetoresistive (AMR), and/or one or more other magnetoresistive technologies as would be understood by those skilled in the relevant art(s)—that may collectively be referred to as xMR technologies.

Magnetic sensors can also include Hall Effect sensors, which are solid state electron devices that operate in response to a magnetic field based upon the Hall Effect principle. The Hall Effect principle is a phenomenon by which a voltage differential is generated across an electrically conducting body in the presence of a magnetic field. Conventional Hall Effect devices can include a planar structure, known as a Hall plate, which is configured to generate an output signal (e.g., either voltage or current) corresponding to an applied magnetic field.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 A illustrates a sensor system according to an exemplary embodiment of the present disclosure.

FIG. 5 illustrates a sensor system according to an exemplary embodiment of the present disclosure.

FIG. 6 illustrates a sensor system according to an exemplary embodiment of the present disclosure.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Magnetic devices can be used for rotational direction, rotational position, and/or rotational speed determinations in magnetic sensors, including, for example in camshaft sensors. Although this disclosure includes discussion of camshaft sensors when describing magnetic sensors, the disclosure is not limited to camshaft sensors. The teachings of this disclosure can be applied to other types of magnetic sensors and/or magnetic sensor environments as would be understood by one of ordinary skill in the relevant arts.

Figure 1A:
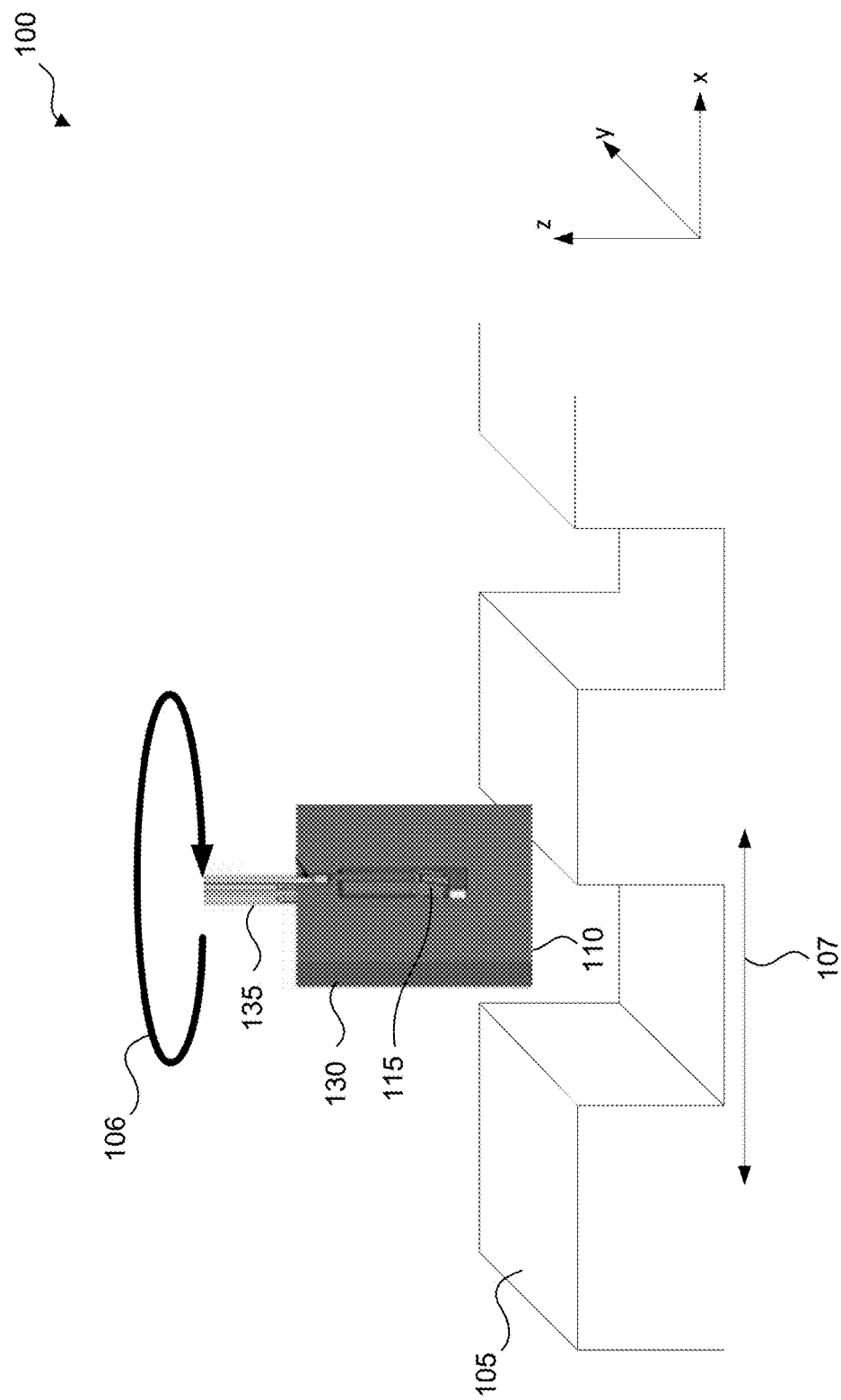
FIG. 1B illustrates a sensor system according to an exemplary embodiment of the present disclosure.

FIG. 1A illustrates sensor system 100 according to an exemplary embodiment of the present disclosure. The sensor system 100 can include a magnetic sensor package 110 spaced apart from an indicator object 105. The sensor package 110 can include one or more sensors 115 and one or more magnets 130. In an exemplary embodiment, the sensor package 110 includes one or more sensors 115 sandwiched between two or more magnets 130.

In an exemplary embodiment, the sensor(s) 115 include processor circuitry configured to detect or sense one or more magnet field components and to generate one or more signals in response to the detected/sensed magnetic field component(s). The sensor 115 can be positioned within an X-Y plane and spaced apart from the indicator object 105 in the Z-direction. In an exemplary embodiment, the sensor(s) 115 are configured to sense magnetic field components extending in the X-direction ($B_X$), Y-direction ($B_Y$), and/or Z-direction ($B_Z$). In an exemplary embodiment, and as discussed in detail below, the sensed magnetic field components can be independent of the rotational position 106 relative the Z-direction of the sensor package 110. This relationship can also be referred to as the sensor package 110 having a twist independent mounting operation.

The first magnetic field component ($B_X$) can be orthogonal (or substantially orthogonal) to the second magnetic field component ($B_Y$), and the third magnetic field component ($B_Z$) can be orthogonal (or substantially orthogonal) to the first ($B_X$) and the second ($B_Y$) magnetic field components.

For example, the first magnetic field component can extend in the X-direction and the second magnetic field component can extend in the Y-direction, which is orthogonal to the X-direction. The third magnetic field component can extend in the Z-direction, which is orthogonal to both the X-direction and the Y-direction. In other embodiments, the magnetic field components can extend in other directions as would be understood by one of ordinary skill in the relevant arts. In operation, the first magnetic field component ($B_X$) can pass substantially parallel to the relative movement direction 107 of the indicator object 105, while the second magnetic field component ($B_Y$) and the third magnetic field component ($B_Z$) can pass substantially perpendicularly to the relative direction 107 of the indicator object 105.

In an exemplary embodiment, the sensor(s) 115 are, for example, Hall Effect device(s) (e.g., Hall plates) configured to generate a sensor signal in response to the presence of a magnetic field (B), but are not limited thereto. In operation, the sensor(s) 115 can generate a voltage and/or voltage differential in the presence of the magnetic field. In one or more embodiments, the voltage and/or voltage differential can be proportional to the applied magnetic field.

In embodiments having two or more sensors 115, the sensors 115 can be spaced apart in, for example, the X-direction by a distance, which can be referred to as the "sensor pitch." An example sensor pitch can be, for example, 2 mm, a distance in the range of 1 to 3 mm, or another distance as would be understood by one of ordinary skill in the relevant arts. In this example, the two sensors 115 can be located within the X-Y plane, which can be referred to as the sensing plane or sensing area. More specifically, a sensing area is a portion of the sensing plane (e.g., the X-Y plane) where the sensors 115 are arranged. For the purposes of this discussion, the sensing plane can refer to the physical location of the sensor(s) 115, and/or can define the plane containing one or more magnetic field components to which the sensors 115 are sensitive, and hence configured to sense.

The magnetic sensor package 110 can include one or more leads 135 that are configured connect the magnetic sensor package 110 to one or more evaluating devices, such as a sensor processor 150 (FIG. 1B), that are configured to process one or more signals generated by and/or received from the sensor(s) 115 via the leads 135. The signals can correspond to sensed magnetic field components and/or changes in such magnetic field components. Evaluating device(s) can also be configured to determine the position, the rotational direction, and/or the rotational speed of the indicator object 105 (discussed in more detail below) based on the processed signal(s).

The one or more magnets 130 can be back-biasing magnets configured to generate a magnetic field that can be defined and/or influenced by the indicator object 105 arranged adjacent to, and spaced from the magnetic sensor package 110.

The indicator object 105 can be a toothed wheel or gear having protruding teeth and recessed depressions (e.g., gaps), and is configured to define and/or influence a magnetic field generated by the magnets 130. In operation, the indicator object 105 can move along direction 107 such that the teeth pass the magnetic device 100 in the direction 107. It is to be understood that the movement may be, for example, a linear movement and/or a rotational movement. In an exemplary embodiment, the direction 107 extends along (or substantially along) the X-direction. The indicator object 105 can be spaced apart along (or substantially along) the Z-direction from the magnetic sensor package 110 by a distance also referred to as the air gap distance. The distance can be within the range of, for example, 0.1 to 5 mm, 0.5 to 2 mm, or another distance as would be understood by one of ordinary skill in the relevant arts. In one or more exemplary embodiments, the air gap distance is, for example, 0.5 mm, 1.0 mm, 1.5 mm, or 2.0 mm, but is not limited thereto.

The indicator object 105 can be magnetized and configured to generate a magnetic field in addition to, or as an alternative to, the magnetic field generated by the magnets 130. In these examples, the indicator object 105 can include magnetized poles (e.g., North and South poles) that generate one or more magnetic fields having one or more magnetic field components. The indicator object 105 can be a pole wheel or pole bar having magnetized poles, where the pole wheel/bar represents magnetic North and South Poles of a periodic permanently magnetized structure arranged next to each other.

For the purpose of this discussion, operation of magnetic sensor systems will be described using the indicator object 105 configured as a toothed wheel or gear. Therefore, the indicator object 105 will be referred to as toothed wheel or target wheel 105. However, the indicator object 105 is not limited to the tooth wheel or gear configuration. The various embodiments described herein can alternatively use a pole wheel or pole bar configuration, or other indicator object configurations as would be understood by one of ordinary skill in the relevant arts.

In an example operation, the toothed wheel 105 rotates and passes the sensor(s) 115 of the magnetic sensor package 110 along the X-direction. As the teeth of the toothed wheel 105 travel past the sensor(s) 115, the sensor(s) 115 can be configured to sense changes in the magnetic field components.

The teeth of the tooth wheel 105 define and/or influence magnetic field components generated by the magnets 130, and/or the magnetic poles of the toothed wheel 105 generate the magnetic field components. In an exemplary embodiment, the magnetic field components include the first magnetic field component ($B_X$), the second magnetic field component ($B_Y$), and the third magnetic field component ($B_Z$). In this example, the sensor package 110 is a three-dimensional (3D) sensor. In other embodiments, the magnetic field components include, for example, the first magnetic field component ($B_X$) and the third magnetic field component ($B_Z$), and the sensor package is a two-dimensional (2D) sensor.

Figure 1B:
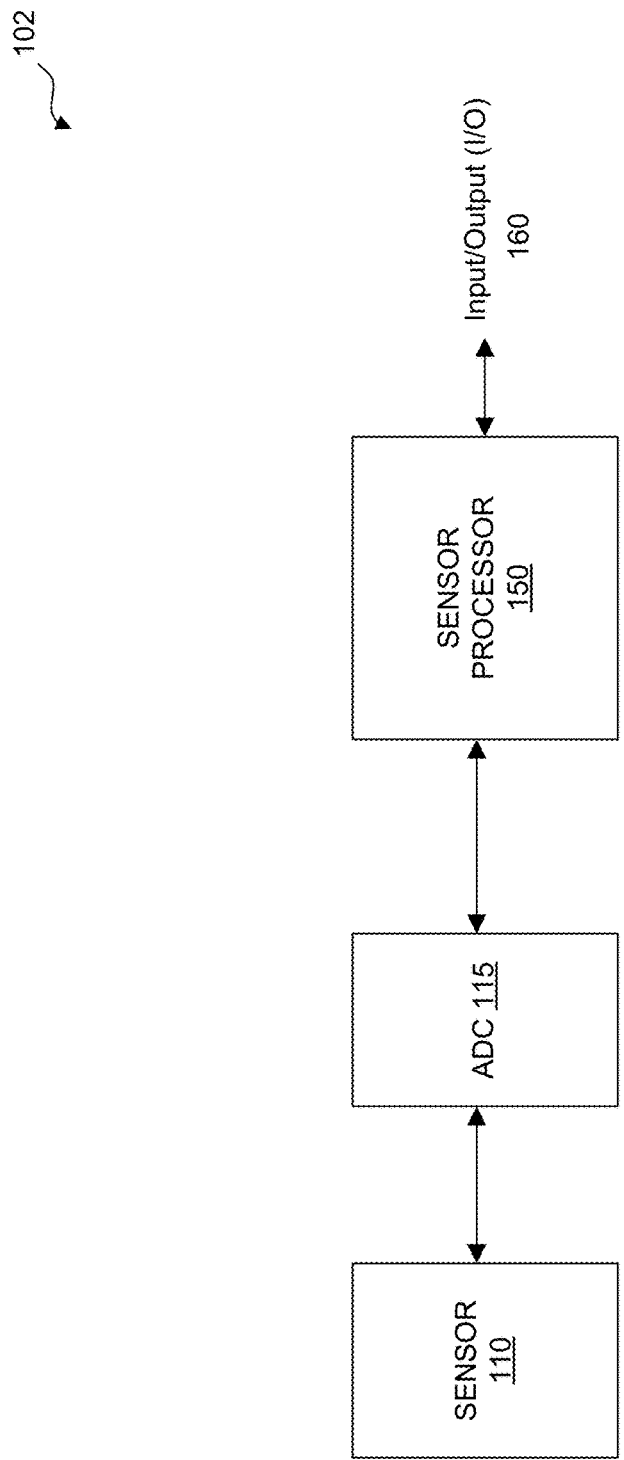

FIG. 1B illustrates a sensor system 102 according to an exemplary embodiment of the present disclosure. The sensor system 102 can include the magnetic sensor package 110 (FIG. 1A) connected to sensor processor 150. In an exemplary embodiment, the sensor system 102 can include analog-to-digital converter (ADC) 115 configured to convert analog signals from the sensor package 110 to generate corresponding digital signals, and to provide the digital signals to the sensor processor 150. The sensor processor 150 can generate one or more signals based on outputs of the sensor package 110 and/or the ADC 115, and provide the generated signal(s) to one or more other components of the sensor system 102 and/or one or more other devices via input/output (I/O) 160.

The sensor processor 150 can include processor circuitry configured to process one or more sensor signals received from the sensor package 110 and/or the ADC 115, and generate one or more output signals based on the received sensor signal(s). The processor circuity can be configured to control the overall operation of the sensor package 110, such as the operation of the sensor(s) 115, and/or the operation of the sensor processor 150. The processor circuitry can be configured to determine and/or define one or more offset values. The offset values can be associated with the calibration of the sensor(s) 115. The sensor processor 150 can be, for example, a signal processor, but is not limited thereto.

Figure 2:
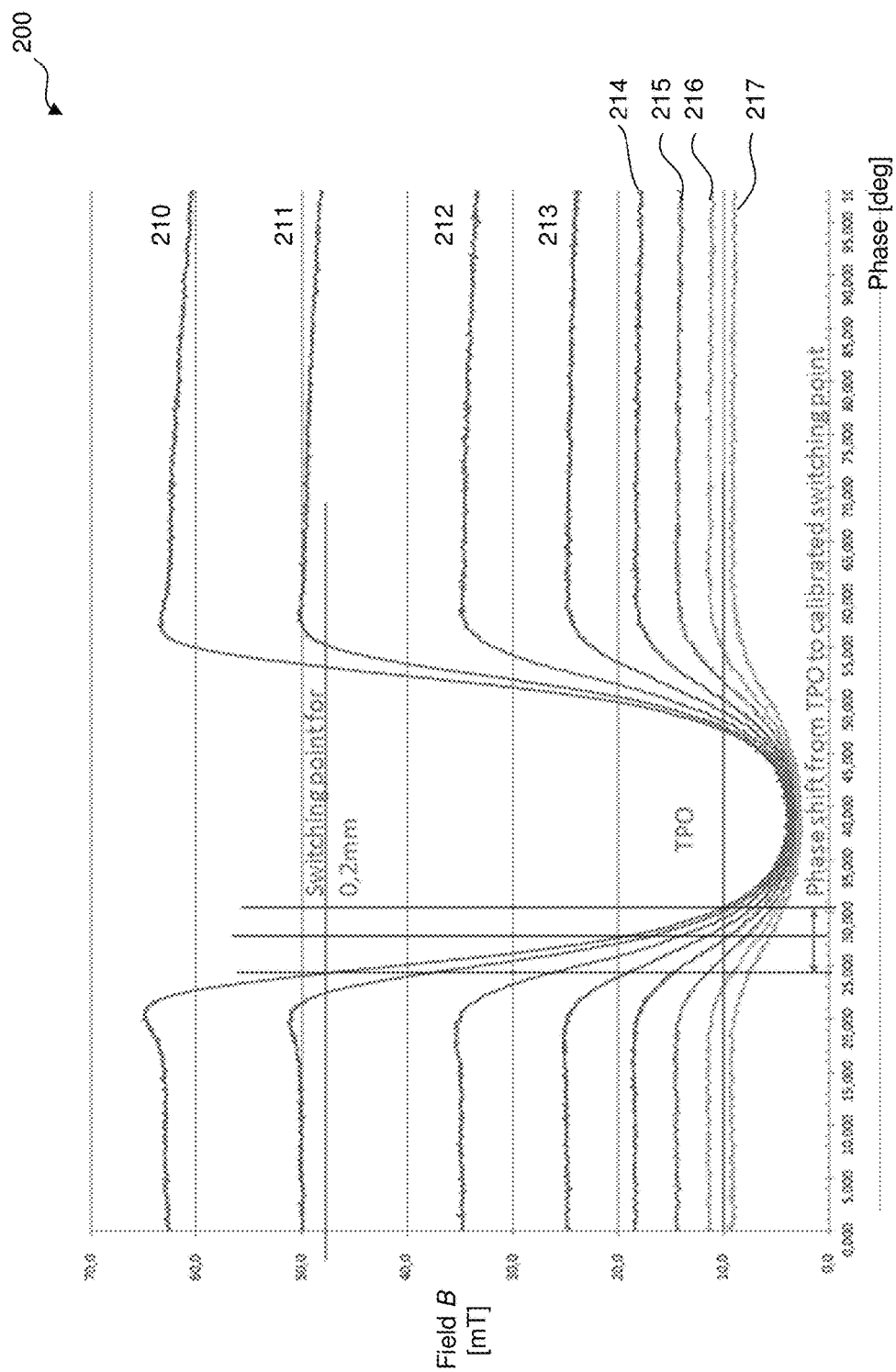
FIG. 2 illustrates example magnetic field signals for various air gap arrangements.

FIG. 2 illustrates a plot 200 of example magnetic field signals 210-217 for various air gap arrangements. The plot 200 illustrates the measured magnetic field (B) based on the phase of the indicator object 105. In this example, the magnetic field signals 210-217 are associated with various air gap distances between the indicator object 105 and the sensor package 110. The air gap distance increases from signals 210 to 217. That is, the signal 210 corresponds to a smallest air gap while signal 217 corresponds to the largest air gap. The plot 200 also illustrates the phase shift (e.g., phase error) between a switching point of sensor package 110 and a true-power-on (TPO) threshold. In this example, the smaller the TPO threshold, the greater the phase shift between the switching point. Further, smaller TPO thresholds are more sensitive to, for example, temperature and/or mechanical variations.

Figure 3A:
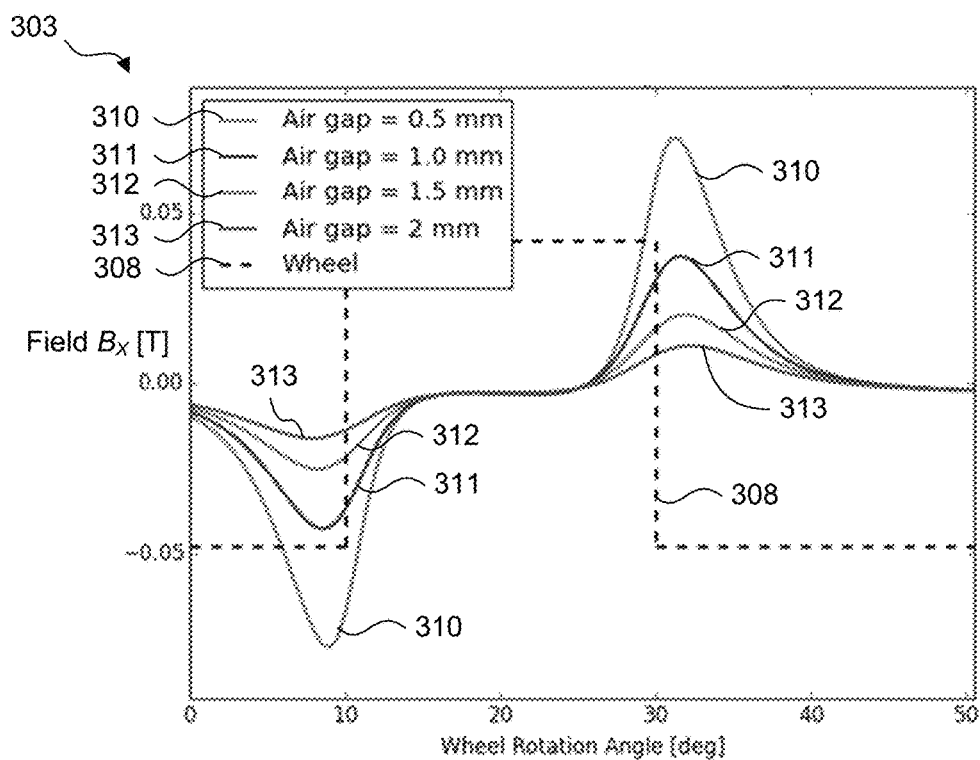
FIGS. 3A and 3B illustrate example magnetic field component signals generated for various air gap arrangements according to exemplary embodiments of the present disclosure.
Figure 3B:
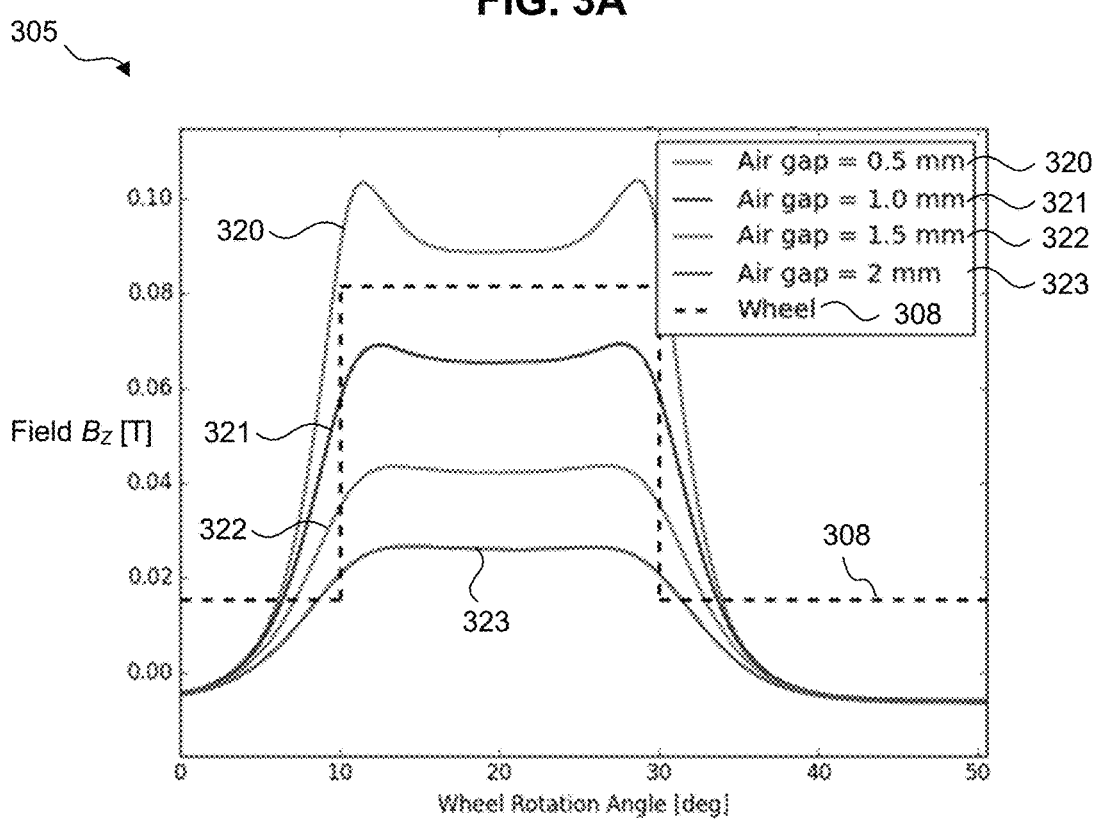

FIGS. 3A and 3B illustrate plots 303 and 305, respectively, of example magnetic field signals for various air gap arrangements. In FIG. 3A, plot 303 illustrates signals 310-313 for the X-direction magnetic field component ($B_X$) with respect to the rotation angle of the target wheel 105. The position of the target wheel 105 is shown by the dashed line 308. Signals 310-313 correspond to the X-direction magnetic field component ($B_X$) for configurations having air gap distances of, for example, 0.5 mm, 1.0 mm, 1.5 mm, and 2.0 mm, respectively, but are not limited thereto.

With reference to FIG. 3B, plot 305 illustrates signals 320-323 for the Z-direction magnetic field component ($B_Z$) with respect to the rotation angle of the target wheel 105. The position of the target wheel 105 is shown by the dashed line 308. Signals 320-323 correspond to the Z-direction magnetic field component ($B_Z$) for configurations having air gap distances of, for example, 0.5 mm, 1.0 mm, 1.5 mm, and 2.0 mm, respectively, but are not limited thereto.

Figure 4:
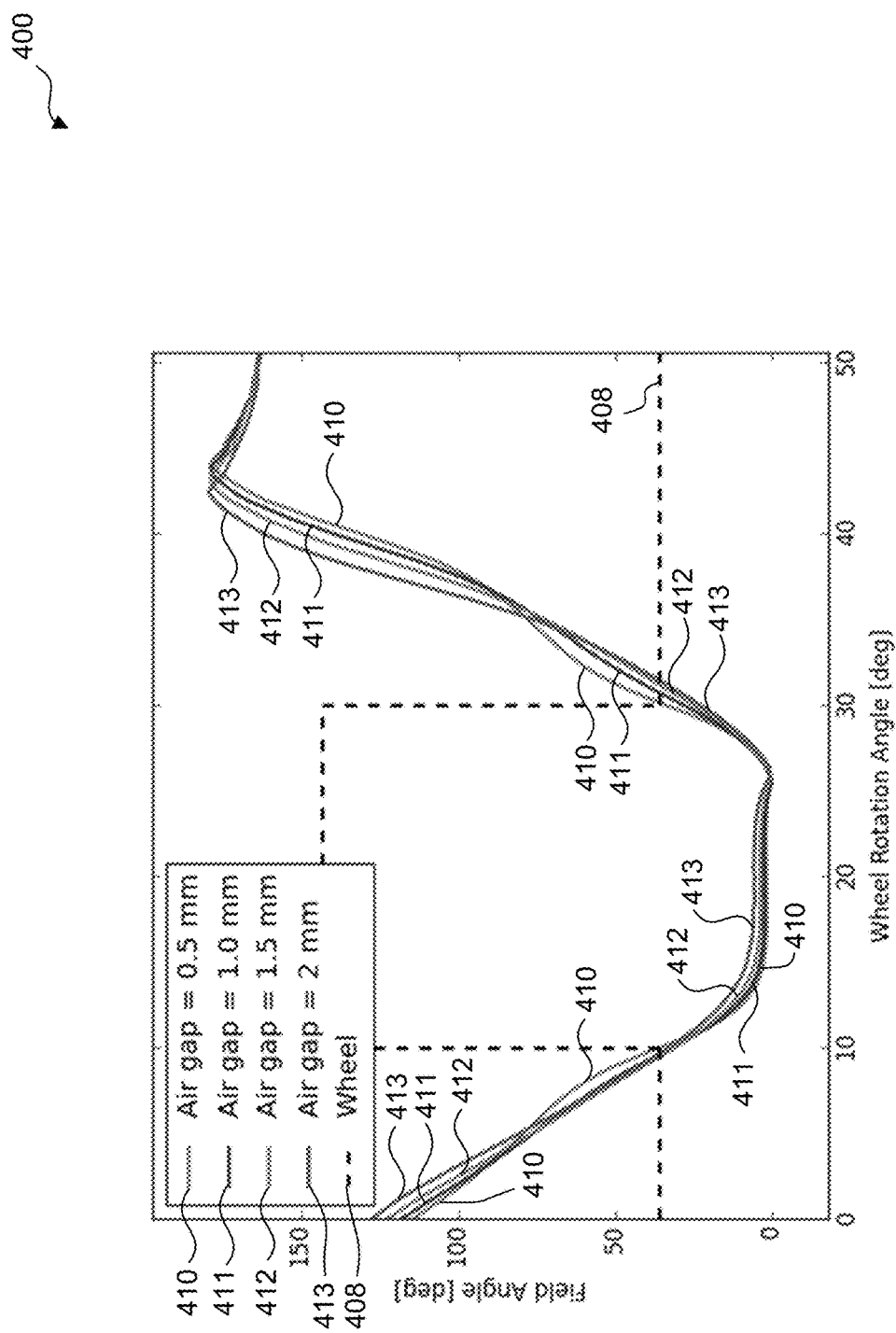
FIG. 4 illustrates example magnetic field angle signals generated for various air gap arrangements according to exemplary embodiments of the present disclosure.

In an exemplary embodiment, with reference to FIG. 4, the angle of the magnetic field with respect to the rotation angle of the target wheel 105 is illustrated. Plot 400 illustrates signals 410-413 that correspond to the magnetic field angle for configurations having air gap distances of, for example, 0.5 mm, 1.0 mm, 1.5 mm, and 2.0 mm, respectively, but are not limited thereto. In this example, the signals 410-413 represent the angle of the magnetic field generated by, for example, the magnet 130 (e.g., back-bias magnet) of the sensor package 110 passing the target wheel 105. The position of the target wheel 105 is shown by the dashed line 408. As shown in FIG. 4, the magnetic field angle has a greater independence with respect to the air gap distance than the magnitude of the magnetic field components illustrated in FIGS. 3A and 3B. That is, the influence of the air gap distance on the magnetic field angle with respect to the rotation angle of the target wheel 105 is less when compared to the influence the air gap distance has on the magnitude of the magnetic field components. In an exemplary embodiment, the magnetic field angle is independent of the air gap distance.

In an exemplary embodiment, the sensor processor 150 is configured to determine a switching threshold of the magnetic field angle with respect to the position of the target wheel 105. In an exemplary embodiment, the switching threshold is the magnetic field angle corresponding to rising and falling edges of the teeth of the target wheel 105. For example, with reference to FIG. 4, the switching threshold (i.e., the TPO threshold) is a magnetic field angle of, for example, 40 degrees, but is not limited hereto. In this example, a magnetic field angle of 40 degrees corresponds to the rising edge and the falling edge of the tooth of the target wheel. 105, which is illustrated by the dashed line 408. In operation, when analyzing the values of the signals 410-413, a field angle value of greater than the switching threshold (e.g., 40 degrees) corresponds to a valley of the target wheel 105 and a field angle less than the switching threshold corresponds to a tooth portion of the target wheel 105. Further, a decreasing magnetic field angle at the threshold identifies a rising edge of the tooth of the target wheel 105, and an increasing magnetic field angle at the threshold identifies a falling edge of the tooth of the target wheel 105. By using the magnetic field angle to determine the position of the target wheel 105, the magnetic sensor package 110 and sensor processor 150 have an improved switching phase accuracy while having twist independent mounting capabilities.

FIG. 5 illustrates a sensor system 500 according to an exemplary embodiment of the present disclosure. The sensor system 500 includes sensor processor 150 configured to receive process one or more sensor signals received from, for example, the sensor package 110 (not shown). For example, the signal processor 150 can receive signals 502 and 504 corresponding to the X-direction magnetic field component ($B_X$) and the Z-direction magnetic field component ($B_Z$), respectively.

In an exemplary embodiment, the sensor processor 150 includes an inverse tangent calculator 510 and a comparator 515. The inverse tangent calculator 510 is configured to receive the X-direction magnetic field component ($B_X$) signal 502 and the Z-direction magnetic field component ($B_Z$) signal 504, and calculate a magnetic field angle based on the signals 502 and 504. The inverse tangent calculator 510 can perform an inverse tangent function on the values of the signals 502 and 504 to calculate an angular value corresponding to the magnetic field angle. The present disclosure is not limited to using the inverse tangent function to determine the magnetic field angle, and one or more embodiments can use one or more other inverse trigonometric functions or other functions to determine the magnetic field angle. For example, the sensor processor 150 can include a calculator configured to perform, for example, an inverse sin function, an inverse cosine function, and/or one or more other functions as would be understood by one of ordinary skill in the relevant arts, to determine the magnetic field angle.

In an exemplary embodiment, the comparator 515 is configured to compare the angular value calculated by the inverse tangent calculator 510 to a threshold value 520. The threshold value 520 can correspond to the switching threshold (e.g., 40 degree as shown in FIG. 4). The switching threshold value 520 can be predetermined, including through, for example, one or more calibration processes. In an exemplary embodiment, the switching threshold value 520 can be dependent on the air gap distance, and the sensor processor 150 can be configured to calculate the switching threshold value 520 based on the air gap distance. In an exemplary embodiment, the threshold value is stored in a memory and the threshold value 520 represents the memory storage medium, but is not limited thereto. In one or more embodiments, the threshold value 520 can represent the threshold value supplied to the comparator 515 from the sensor processor 150, from one or more other components of the sensor system 500, and/or one or more external devices.

In operation, the comparator 515 compares the switching threshold value 520 to the magnetic field angle value calculated by the inverse tangent calculator 510, and generates an output 516 based on the comparison. For example, the comparator 515 can be configured to generate a low signal when the value of the magnetic field angle is greater than the switching threshold value 520. In this example, the low signal corresponds to a valley of the target wheel 105. The comparator 515 can be configured to generate a high signal when the value of the magnetic field angle is less than the switching threshold. In this example, the high signal corresponds to a tooth portion of the target wheel 105.

In an exemplary embodiment, the sensor processor 150 can be configured to offset one or more of the inputs (e.g., signals 502, 504) to the inverse tangent calculator 510 and/or the switching threshold value 520. For example, the sensor processor 150 can include a subtractor 530 configured to subtract an offset 525 from the value Z-direction magnetic field component ($B_Z$) signal 504 to generate an offset adjusted Z-direction magnetic field component ($B_Z$) signal 505. In this example, the offset subtraction of the Z-direction magnetic field component ($B_Z$) signal 504 can be performed to force the value of the Z-direction magnetic field component ($B_Z$) supplied to the inverse tangent calculator 510 to be positive.

FIG. 6 illustrates a sensor system 600 according to an exemplary embodiment of the present disclosure. The sensor system 600 includes sensor processor 150 configured to receive process one or more sensor signals received from, for example, the sensor package 110 (not shown). For example, the signal processor 150 can receive signals 502, 503, and 504 corresponding to the X-direction magnetic field component ($B_X$), Y-direction magnetic field component ($B_Y$), and the Z-direction magnetic field component ($B_Z$), respectively. In this example, the sensor system 600 is a three-dimensional (3D) sensor.

In an exemplary embodiment, the sensor processor 150 includes the inverse tangent calculator 510, the comparator 515, and a quadratic calculator 605. The quadratic calculator 605 is configured to receive the X-direction magnetic field component ($B_X$) signal 502 and the Y-direction magnetic field component ($B_Y$) signal 503, and calculate a quadratic sum based on the signals 502 and 503. In an exemplary embodiment, the quadratic calculator 605 is configured to calculate a quadratic sum Q that satisfies the following equation:

$$Q = \sqrt{X^2 + Y^2}$$

where X is the value of the magnetic field component in the X-direction and Y is the value of the magnetic field component in the Y-direction.

In an exemplary embodiment, the inverse tangent calculator 510 is configured to receive a quadratic sum value (e.g., quadratic sum Q) from the quadratic sum calculator 605 and the Z-direction magnetic field component ($B_Z$) signal 504 (or offset corrected signal 505), and calculate a magnetic field angle based on the quadratic sum value and the signal 504/505. The inverse tangent calculator 510 can perform an inverse tangent function on the quadratic sum value and the value of the signal 504 to calculate an angular value corresponding to the magnetic field angle. Again, the present disclosure is not limited to using the inverse tangent function to determine the magnetic field angle, and one or more embodiments can use one or more other functions to determine the magnetic field angle. For example, the sensor processor 150 can include a calculator configured to perform, for example, an inverse sin function, an inverse cosine function, and/or one or more other functions as would be understood by one of ordinary skill in the relevant arts, to determine the magnetic field angle.

In the sensor system 600, the implementation of a quadratic sum of the magnetic field components of the X and Y directions provides the sensor 600 with a twist independent mounting operation. In this example, the sensed magnetic field components can be independent of the rotational position 106 of the sensor package 110. For example, if the sensor package 110 is orientated at a first position in the X-Y plane, such as at zero degrees with respect to the X-axis (the front of the sensor package 110 faces the X-axis), the Y-direction magnetic field component will be zero and the X-direction magnetic field component will correspond to the magnetic field along the rotation direction of the target wheel 105. In a second position where the sensor package 110 is rotated 90 degrees to be orientated along the Y-axis, the X-direction magnetic field component will be zero and the Y-direction magnetic field component will correspond to the magnetic field along the rotation direction of the target wheel 105. In this example, if the sensor package 110 was positioned at 45 degrees (rotated halfway between the X-axis and the Y-axis), the X-direction magnetic field component and the Y-direction magnetic field component will each correspond to half of the magnetic field along the rotation direction of the target wheel 105.

Further, using the magnetic field angle calculated based on the quadratic sum value and the magnetic field components of the Z direction, the magnetic sensor package 110 and sensor processor 150 have an improved switching phase accuracy while having twist independent mounting.

Similar to sensor system 500 of FIG. 5, the comparator 515 can be configured to compare the angular value calculated by the inverse tangent calculator 510 to a threshold value 520. The threshold value 520 can correspond to the switching threshold (e.g., 40 degree as shown in FIG. 4). The switching threshold value 520 can be predetermined, including through, for example, one or more calibration processes. In an exemplary embodiment, switching threshold value 520 can be dependent on the air gap distance, and the sensor processor 150 can be configured to calculate the switching threshold value 520 based on the air gap distance. For example, the sensor processor 150 can be configured to calculate a threshold value and/or adjust a previously determined threshold value based on the air gap distance between the sensor package 110 and the target wheel 105.

In operation, the comparator 515 compares the switching threshold value 520 to the magnetic field angle value calculated by the inverse tangent calculator 510, and generates an output 516 based on the comparison. For example, the comparator 515 can be configured to generate a low signal when the value of the magnetic field angle is greater than the switching threshold. In this example, the low signal corresponds to a valley of the target wheel 105. The comparator 515 can be configured to generate a high signal when the value of the magnetic field angle is less than the switching threshold. In this example, the high signal corresponds to a tooth portion of the target wheel 105.

In an exemplary embodiment, the sensor processor 150 can be configured to offset one or more of the inputs (e.g., signals 502-504) provided to the quadratic calculator 605 and/or the inverse tangent calculator 510, and/or the switching threshold value 520. For example, the sensor processor 150 can include a subtractor 530 configured to subtract an offset 525 from the value Z-direction magnetic field component ($B_Z$) signal 504 to generate an offset adjusted Z-direction magnetic field component ($B_Z$) signal 505. In this example, the offset subtraction of the Z-direction magnetic field component ($B_Z$) signal 504 can be performed to force the value of the Z-direction magnetic field component ($B_Z$) supplied to the inverse tangent calculator 510 to be positive.

In an exemplary embodiment, the sensor processor 150 is configured to calculate another quadratic sum of the X-direction magnetic field component ($B_X$) 502, Y-direction magnetic field component ($B_Y$) 503, and the Z-direction magnetic field component ($B_Z$) 504 to generate an amplitude dependent factor. The sensor processor 150 can be further configured to adjust the magnetic field angle calculated by the inverse tangent calculator 510 based on the amplitude dependent factor. In this example, although not illustrated in FIG. 6, the quadratic calculator 605 can be configured to also receive the Z-direction magnetic field component ($B_Z$) 504 and calculate the other quadratic sum based on the X-direction magnetic field component ($B_X$) 502, Y-direction magnetic field component ($B_Y$) 503, and the Z-direction magnetic field component ($B_Z$) 504. In an exemplary embodiment, the other quadratic sum can also be provided to the inverse tangent calculator 510 and the inverse tangent calculator 510 can be configured to adjust the magnetic field angle that is calculated by the inverse tangent calculator 510 based on the X-direction magnetic field component ($B_X$) 502 and the Y-direction magnetic field component ($B_Y$) 503.

Figure 7:
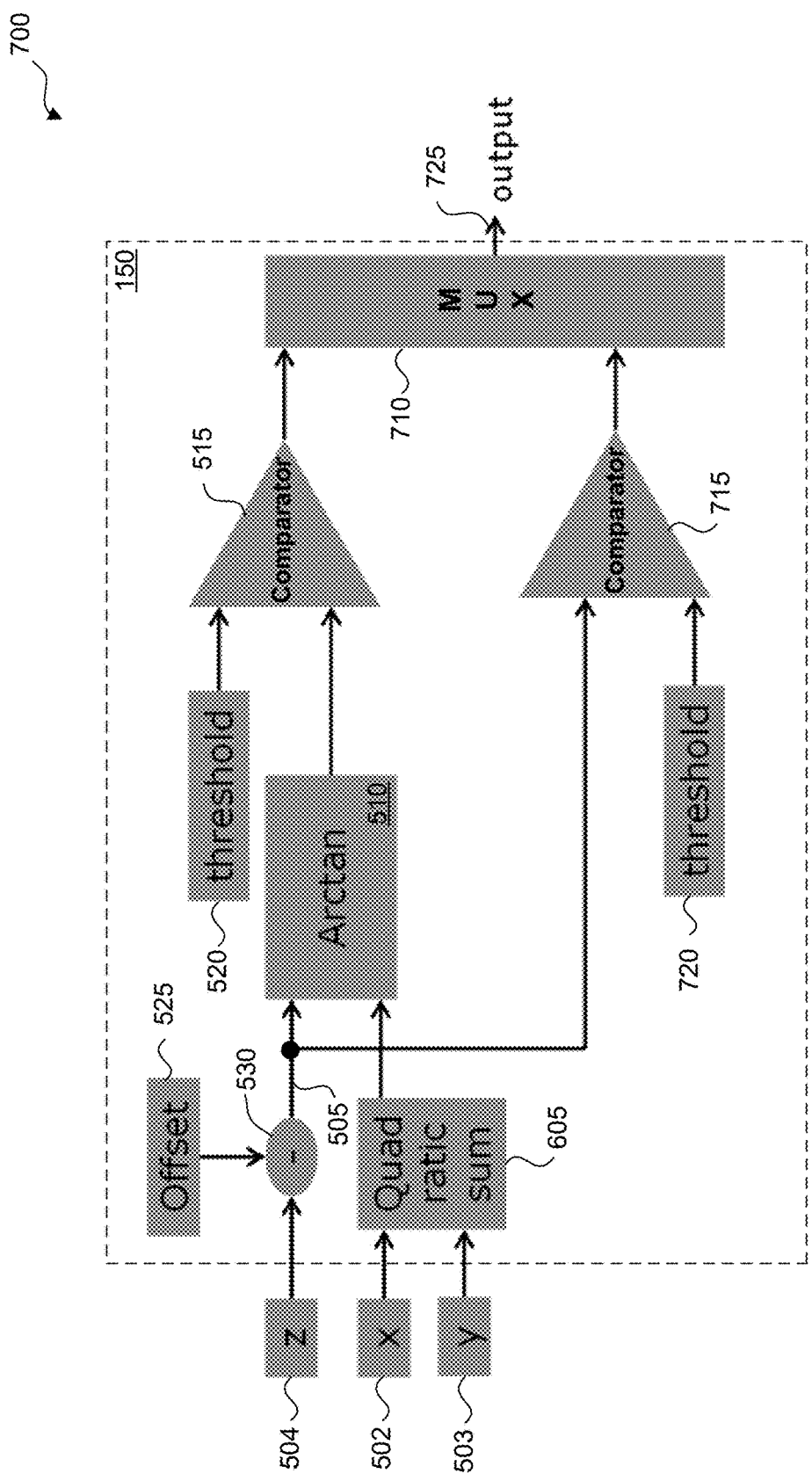
FIG. 7 illustrates a sensor system according to an exemplary embodiment of the present disclosure.

FIG. 7 illustrates a sensor system 700 according to an exemplary embodiment of the present disclosure. The sensor system 700 is similar to sensor system 600, and includes sensor processor 150 configured to receive process one or more sensor signals received from, for example, the sensor package 110 (not shown). For example, the signal processor 150 can receive signals 502, 503, and 504 corresponding to the X-direction magnetic field component ($B_X$), Y-direction magnetic field component ($B_Y$), and the Z-direction magnetic field component ($B_Z$), respectively. In this example, the sensor system 700 is a three-dimensional (3D) sensor.

In an exemplary embodiment, the sensor processor 150 includes the inverse tangent calculator 510, the first comparator 515, the quadratic calculator 605, a second comparator 715, a second switching threshold value 720, and a multiplexer (MUX) 710. For brevity, some or all of the discussion of the inverse tangent calculator 510, the first comparator 515, and the quadratic calculator 605 may have been omitted below.

In an exemplary embodiment, the quadratic calculator 605, the inverse tangent calculator 510, and the first comparator 515 are configured to cooperatively provide an output signal (to the MUX 710) representative of a characteristic (e.g., position, movement, rotational speed, etc.) of the target wheel 105 based on the magnetic field angle similar to the exemplary embodiments described with reference to FIG. 6.

As illustrated in FIG. 7, the sensor system 700 can further include the second comparator 715 configured to generate an output signal representative of a characteristic of the target wheel 105 based on the value of the Z-direction magnetic field component ($B_Z$). As explained in detail below, the MUX 710 can be configured to select between the outputs of the comparator 515 and the comparator 715 as the output 725 of the sensor system 700.

In an exemplary embodiment, the comparator 715 is configured to receive the value of the Z-direction magnetic field component ($B_Z$) and a threshold value from the second switching threshold value 720. The comparator 715 is configured to compare the value of the Z-direction magnetic field component ($B_Z$) and the second switching threshold value, and generates an output based on the comparison. This output is then provided to the multiplexer 710. In an exemplary embodiment, the comparator 715 and the comparator 515 are the same type of comparator and/or functionally identical, but are not limited to such a configuration. In other embodiments, the comparators 515 and 715 can be different.

In this example, the threshold value 720 can correspond to a magnetic field threshold value. The threshold value 720 can be predetermined, including through, for example, one or more calibration processes. In an exemplary embodiment, switching threshold value 720 can be dependent on the air gap distance, and the sensor processor 150 can be configured to calculate the switching threshold value 720 based on the air gap distance.

In operation, the comparator 715 compares the switching threshold value 720 to the value of the Z-direction magnetic field component ($B_Z$), and generates an output based on the comparison. For example, the comparator 715 can be configured to generate a low signal when the value of the Z-direction magnetic field component ($B_Z$) is greater than the switching threshold. In this example, the low signal corresponds to a valley of the target wheel 105. The comparator 515 can be configured to generate a high signal when the value of the magnetic field angle is less than the switching threshold. In this example, the high signal corresponds to a tooth portion of the target wheel 105. In an exemplary embodiment, the sensor processor 150 can be configured to adjust the threshold value 720 based on the magnetic field angle calculated by the inverse tangent calculator 510.

In an exemplary embodiment, the multiplexer (MUX) 710 is configured to receive the outputs of the comparator 515 and the comparator 715, and selectively output one of the outputs as output 725. In an exemplary embodiment, the MUX 710 can be configured to select between the outputs of the comparators 515 and 715 based on, for example, a mode of operation of the sensor system 700.

In an exemplary embodiment, the selection by the MUX 710 can be based on the rotational speed of the target wheel 105. For example, when the rotational speed is less than or equal to a rotational speed threshold, the MUX 710 can select the output of the comparator 515. When the rotational speed is greater than the rotational speed threshold, the MUX 710 can select the output of the comparator 715. In this example, in lower rotational speed operations, using the magnetic field angle to determine the position of the target wheel provides an improved switching phase accuracy. In higher rotational speed operations, the selection to use the value of the Z-direction magnetic field component ($B_Z$) provides increased jitter compensation while ensuring the sampling resolution of the comparator 715 is sufficient for the higher rotational speeds.

In an exemplary embodiment, based on the operation modes of the sensor system 700, the components of the sensor system not being used in determining the characteristic of the target wheel 105 can, for example, enter a reduced power mode, a sleep mode, or be powered off. For example, when the output of the comparator 515 is selected by the MUX 710 as the output 725, the comparator 715 can enter a reduced power mode etc. Similarly, when the comparator 715 is selected by the MUX 710 as the output 725, one or more of: the quadratic calculator 605, the inverse tangent calculator 510, and the comparator 515 can enter a reduced power mode, etc.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, code, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

What is claimed is:

1. A sensor system, comprising:
   a sensor configured to sense magnetic field components and to generate corresponding magnetic field component signals based on the sensed magnetic field components;
   an angle detector configured to calculate a magnetic field angle based on a first subset of the magnetic field component signals from the sensor;
   a first comparator configured to compare the magnetic field angle from the angle detector and a first threshold value to generate a first detection signal;
   a second comparator configured to compare the second subset of the magnetic field components from the sensor and a second threshold value to generate a second detection signal; and
   a selector configured to select between the first and the second detection signals based on a movement characteristic the target object to selectively output the first and second detection signals to detect one or more edges of the target object.

2. The sensor system of claim 1, wherein:
   the first subset of the magnetic field components comprises first, second, and third magnetic field components; and
   the second subset of the magnetic field components comprises only the third magnetic component.

3. The sensor system of claim 1, wherein:
   the first subset of magnetic field components comprise first and second magnetic field components;
   the sensor system further comprises a quadratic sum calculator that is configured to calculate a quadratic sum of the first magnetic field component and the second magnetic field component; and
   the angle detector is configured to calculate the magnetic field angle based on the quadratic sum.

4. The sensor system of claim 3, wherein:
   the first magnetic field component extends in a first direction, the target object being configured to move past the sensor along the first direction; and
   the second magnetic field component extends in second direction orthogonal to the first direction, the sensor being disposed in a plane defined by the first and the second directions.

5. The sensor system of claim 3, wherein:
   the first subset of the magnetic field components further comprises a third magnetic field component; and
   the angle detector is configured to calculate the magnetic field angle based on the quadratic sum and the third magnetic field component.

6. The sensor system of claim 5, wherein:
   the first magnetic field component extends in a first direction, the target object being configured to move past the sensor along the first direction;
   the second magnetic field component extends in second direction orthogonal to the first direction, the sensor being disposed in a plane defined by the first and the second directions; and
   the third magnetic field component extends in a third direction orthogonal to the first direction and the second direction, the sensor being spaced from the target object in the third direction.

7. The sensor system of claim 1, wherein:
   the first subset of the magnetic field components comprise first, second and third magnetic field components;
   the sensor system further comprises a quadratic sum calculator that is configured to calculate a quadratic sum of the first magnetic field component and the second magnetic component; and
   the angle detector is configured to: calculate an inverse trigonometric value based on the quadratic sum and the third magnetic field component; and calculate the magnetic field angle based on the inverse trigonometric value.

8. The sensor system of claim 7, wherein the angle detector is configured to perform an inverse tangent calculation based on the quadratic sum and the third magnetic field component to calculate the inverse trigonometric value.

9. The sensor system of claim 1, wherein the second threshold value is adjustable based on the magnetic field angle.

10. A sensor system, comprising:
    a sensor configured to sense first, second, and third magnetic field components and to generate corresponding first, second, and third magnetic field component signals based on the sensed first, second, and third magnetic field components;

an angle calculator that is configured to calculate a magnetic field angle based on the first and the second magnetic field component signals from the sensor;

a sensor processor that is configured to determine which of a first mode of operation and a second mode of operation the sensor system is operating based on a movement characteristic a target object and generate a mode signal corresponding to the determined more of operation; and a multiplexer that is configured to selectively generate an output signal based on:

the calculated magnetic field angle when the mode signal indicates that the sensor system is operating in the first mode of operation; and only the third magnetic field component when the mode signal indicates that the sensor system is operating in the second mode of operation, wherein the output signal corresponds to a detected one or more edges of the target object.

11. The sensor system of claim 10, further comprising:

a first comparator that is configured to compare the magnetic field angle to a first threshold value to generate a first detection signal; and a second comparator that is configured to compare the third magnetic field component to a second threshold value to generate a second detection signal, wherein the multiplexer is configured to generate the output signal based on:

the first detection signal in the first mode of operation, and the second detection signal in the second mode of operation.

12. The sensor system of claim 10, wherein the detecting of the one or more edges includes determining at least one of:

a position of the target object with respect to the sensor;

a movement direction of the target object with respect to the sensor; and a proximity of a tooth or gap portion of the target object.

13. The sensor system of claim 10, further comprising a quadratic sum calculator that is configured to calculate a quadratic sum of the first magnetic field component signal and the second magnetic component signal, wherein the angle detector is configured to calculate the magnetic field angle based on the quadratic sum.

14. The sensor system of claim 13, wherein:

the first magnetic field component extends in a first direction, the target object being configured to move past the sensor along the first direction; and the second magnetic field component extends in second direction orthogonal to the first direction, the sensor being disposed in a plane defined by the first and the second directions.

15. The sensor system of claim 13, wherein the angle detector is configured to calculate the magnetic field angle based on the quadratic sum and the third magnetic field component.

16. The sensor system of claim 15, wherein:

the first magnetic field component extends in a first direction, the target object being configured to move past the sensor along the first direction;

the second magnetic field component extends in second direction orthogonal to the first direction, the sensor being disposed in a plane defined by the first and the second directions; and the third magnetic field component extends in a third direction orthogonal to the first direction and the second direction, the sensor being spaced from the target object in the third direction.

17. The sensor system of claim 10, wherein:

the sensor system further comprises a quadratic sum calculator that is configured to calculate a quadratic sum of the first magnetic field component and the second magnetic component; and the angle detector is configured to: calculate an inverse trigonometric value based on the quadratic sum and the third magnetic field component; and calculate the magnetic field angle based on the inverse trigonometric value.

18. The sensor system of claim 17, wherein the angle detector is configured to perform an inverse tangent calculation based on the quadratic sum and the third magnetic field component to calculate the inverse trigonometric value.

19. The sensor system of claim 10, wherein:

the first magnetic field component extends in a first direction, the target object being configured to move past the sensor along the first direction;

the second magnetic field component extends in second direction orthogonal to the first direction, the sensor being disposed in a plane defined by the first and the second directions; and the third magnetic field component extends in a third direction orthogonal to the first direction and the second direction, the sensor being spaced from the target object in the third direction.

20. The sensor system of claim 11, wherein the second threshold value is adjustable based on the magnetic field angle.

21. The sensor system of claim 10, wherein a determination of the one or more edges of the target object in the first mode of operation has a higher accuracy than the determination of the one or more edges of the target object in the second mode of operation.

22. A sensor system, comprising:

a sensor configured to sense first, second, and third magnetic field components and to generate corresponding first, second, and third magnetic field component signals based on the sensed first, second, and third magnetic field components; and a calculator circuit that is configured to calculate a quadratic sum of the first magnetic field component signal and the second magnetic component signal;

an angle detection circuit that is configured to calculate, using an inverse trigonometric function, a magnetic field angle based on the quadratic sum and the third magnetic field component; and a multiplexer that is configured to: select between the calculated magnetic field angle and the third magnetic field component based on a movement characteristic of a target object; and generate an output signal based on the selection, the output signal corresponding to a detected one or more edges of the target object.

23. The sensor system of claim 22, wherein:

the calculator circuit is configured to calculate a second quadratic sum of the first magnetic field component signal, the second magnetic component signal and the third magnetic field component signal; and the angle detection circuit is configured to adjust the calculated magnetic field angle based on the second quadratic sum.

24. The sensor system of claim 22, wherein the movement characteristic is a rotational speed of the target object.

\* \* \* \* \*